US010822179B1

(12) United States Patent
McCabe

(10) Patent No.: US 10,822,179 B1
(45) Date of Patent: Nov. 3, 2020

(54) PRE-SORTER FOR ARTICLES OF LAUNDRY

(71) Applicant: Chicago Dryer Company, Chicago, IL (US)

(72) Inventor: Stanley G. McCabe, Lubbock, TX (US)

(73) Assignee: Chicago Dryer Company, Chicago, IL (US)

( * ) Notice: Subject to any disclaimer, the term of this patent is extended or adjusted under 35 U.S.C. 154(b) by 0 days.

(21) Appl. No.: 16/439,270

(22) Filed: Jun. 12, 2019

(51) Int. Cl.
*D06F 93/00* (2006.01)
*B65G 47/50* (2006.01)

(52) U.S. Cl.
CPC ............. *B65G 47/50* (2013.01); *D06F 93/00* (2013.01); *B65G 2201/0229* (2013.01)

(58) Field of Classification Search
CPC .. B65G 47/50; B65G 2201/0229; D06F 93/00
USPC .......................... 414/13; 209/44.2, 644, 659
See application file for complete search history.

(56) References Cited

U.S. PATENT DOCUMENTS

| | | | | |
|---|---|---|---|---|
| 3,706,450 A | * | 12/1972 | Gerstenberger | D06F 89/00 493/14 |
| 4,036,365 A | * | 7/1977 | Rosenfeld | D06F 95/00 209/3.1 |
| 4,136,778 A | * | 1/1979 | Wortman | D06F 93/00 378/45 |
| 5,149,904 A | * | 9/1992 | Kamiya | G10H 1/02 84/395 |
| 7,370,765 B1 | * | 5/2008 | Ellenberger | B07C 5/3412 209/644 |
| 8,261,917 B2 | * | 9/2012 | Enenkel | B07C 1/10 209/540 |
| 2005/0171638 A1 | * | 8/2005 | Uehigashi | G05D 1/0238 700/245 |
| 2006/0124433 A1 | * | 6/2006 | Weir | B65G 47/1478 198/455 |
| 2007/0000158 A1 | * | 1/2007 | Baboz | D06F 67/04 38/17 |
| 2008/0092415 A1 | | 4/2008 | Mccabe | |
| 2012/0308339 A1 | | 12/2012 | Mccabe | |
| 2014/0193224 A1 | | 7/2014 | Mccabe | |
| 2016/0175889 A1 | * | 6/2016 | Yamaguchi | B07C 5/368 209/644 |
| 2018/0347104 A1 | | 12/2018 | Mccabe | |

* cited by examiner

*Primary Examiner* — Lynn E Schwenning
(74) *Attorney, Agent, or Firm* — Lempia Summerfield Katz LLC

(57) ABSTRACT

Articles of laundry, such as towels, of different sizes are sorted. The articles are clamped from a jumble. The clamp moves upward for sensing a size. For sorting, different size articles are blown to different tracks, such as different conveyors. The articles, resting on the conveyors, are conveyed to different exits for the different sizes.

19 Claims, 3 Drawing Sheets

PRE-SORTER FOR ARTICLES OF LAUNDRY

BACKGROUND

The present invention relates to automated laundry sorting. Many processes in laundries are automated. For example, machines in hotels spread out, iron, and fold sheets or towels without operator intervention. Different machines may be used for different sizes of articles of laundry. The articles of laundry, such as towels or sheets, of different sizes may be mixed together. Laundries often use manual labor to separate the articles of laundry by size to avoid machine downtime due to an article of the wrong size being fed to a machine. Manual labor is costly and inconsistent.

One sorting system sorts sheets hung on rails. Sheets of different sizes are lifted to rails along the ceiling, where the length of the sheet is sensed by photocells. Based on the length, the clips holding the sheets are sent along different rails. Such rail based systems are overly large and not designed to handle other types of articles of laundry.

SUMMARY

By way of introduction, the preferred embodiments described below include apparatuses and methods for sorting articles of laundry, such as sorting towels, of different sizes. The articles are clamped from a jumble. The clamp moves upward for sensing a size. For sorting, different size articles are blown to different tracks, such as different conveyors. The articles, resting on the conveyors, are conveyed to different exits for the different sizes.

In a first aspect, an apparatus is provided for sorting towels. A first clamp is positioned to clamp a first one of the towels from a bin holding the towels. The first clamp is movable to lift the first towel from the bin. A first sensor is positioned to measure a first length of the first towel when lifted from the bin. A first air nozzle is positioned to blow the first towel onto a first conveyor, and a second air nozzle is positioned to blow the first towel onto a second conveyor. A controller is configured to activate the first air nozzle when the first length is below a threshold and activate the second air nozzle when the first length is above the threshold.

In a second aspect, a method is provided for sorting different sized towels. Towels are lifted from a jumble. The sizes of the towels are determined while lifted. An air blast disposes the towels of a first size on a first conveyor and the towels of a second size on a second conveyor. The towels of the first size are conveyed by the first conveyor, and the towels of the second size are conveyed by the second conveyor.

In a third aspect, a laundry sorting system is provided. A sensor is arranged to establish a difference in articles of laundry while hanging. One or more ports are arranged to blow different ones of the articles of laundry towards different locations based on the difference. A first track is positioned to receive the articles of laundry blown to a first one of the different locations, and a second track is positioned to receive the articles of laundry blown to a second one of the different locations. The first track is separate from the second track.

The present invention is defined by the following claims, and nothing in this section should be taken as a limitation on those claims. Further aspects and advantages of the invention are discussed below in conjunction with the preferred embodiments.

BRIEF DESCRIPTION OF SEVERAL VIEWS OF THE DRAWINGS

The components of the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

FIGS. 1-4 show various aspects of one embodiment of a laundry sorter. Various stages and aspects of the embodiment may be altered or changed based on now known or later developed devices or methods. The sorter sorts the articles of laundry from a load or pile of articles. The sorted articles may be delivered to separate trucks or other bins as a pre-sort or sorting in a soiled laundry operation for delivery to washing machines. The sorted articles may be delivered to further automation machines. For example, sorted towels are delivered to spreader or picker machines that lay out the towels flat, which are then feed to folding machines (e.g., an automated towel folder, such as disclosed in U.S. Pat. No. 5,300,007), stacking machines (e.g., automated towel stacker, such as disclosed in U.S. Published Patent Application No. 2018-0347104), ironing machines, spreader machines, or another automated processing machine. Different processes and/or different machines are provided for textiles of different sizes, so the textiles are sorted.

The sorter described herein is adapted for sorting towels, such as sorting bath towels, hand towels, and wash cloths (e.g., face towels). The sorting may be between two size classes (e.g., sorting wash cloths from other size towels) or between three or more size classes (e.g., sorting wash cloths, hand towels, bath towels, and beach towels). The towels of different sizes may be square or rectangular. Towel short sides may range from 6 to 40 inches, and towel long sides may range from 6 to 90 inches. Larger or smaller articles of laundry or textiles may also be processed. Textiles of thinner material, such as woven or knit pillow cases, pillow shams, or other laundry articles, with different sizes may be sorted. Clothing or fabric bags of different shapes and sizes may be sorted. Other articles of laundry, such as sheets or blankets, may be sorted. Any textiles or articles of laundry may be sorted.

In general, the laundry sorting system includes a sensor arranged to establish a difference in articles of laundry while hanging. One or more ports are arranged to blow different ones of the articles of laundry towards different locations based on the difference. A first track is positioned to receive the articles of laundry blown to a first one of the different locations, and a second track is positioned to receive the articles of laundry blown to a second one of the different locations. The first track is separate from the second track. Additional, different or fewer components and associated acts may be provided. For example, the specific components of the apparatus for sorting towels of FIGS. 1-4 are provided.

Figure 1:
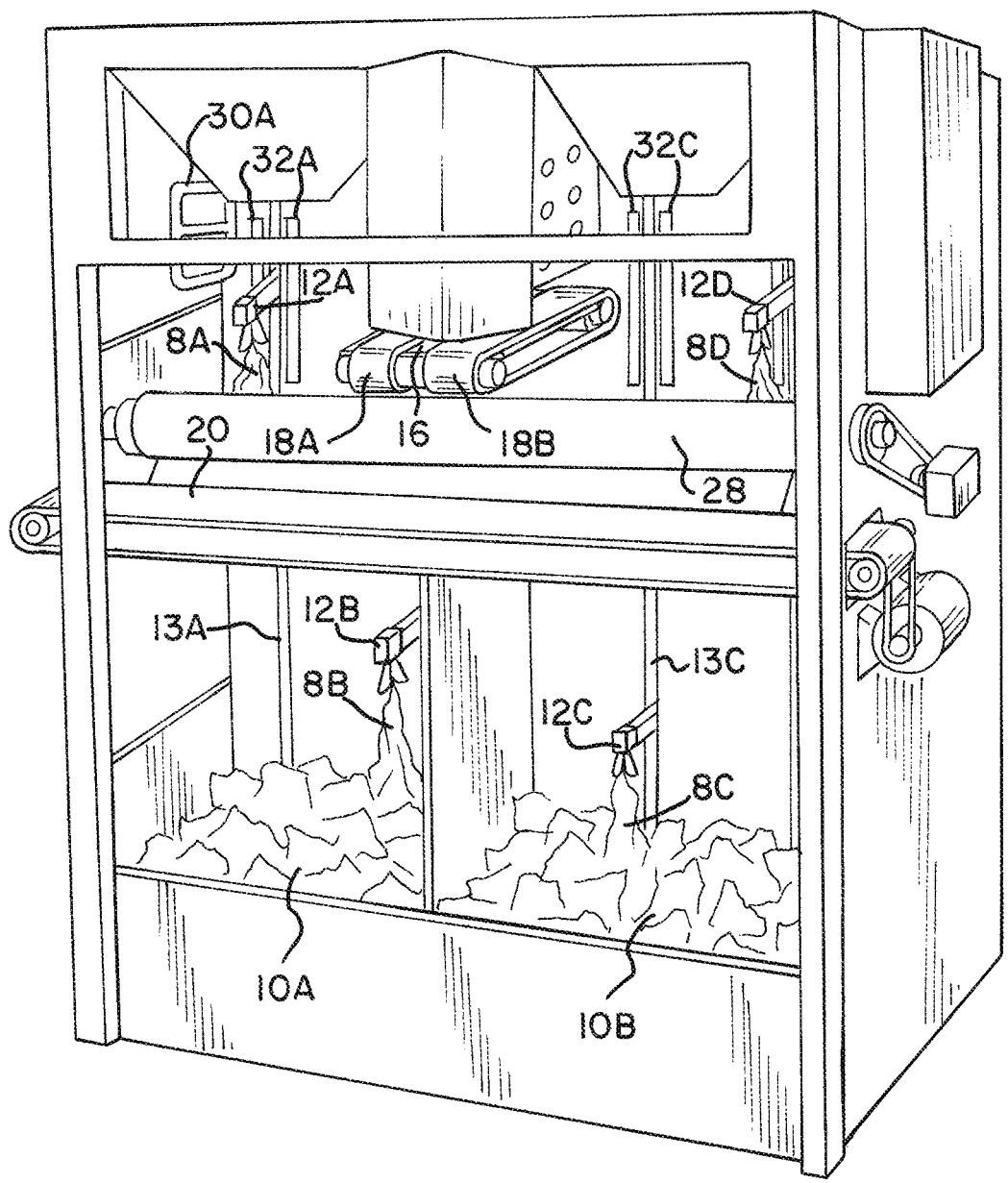
FIG. 1 is a perspective view of a laundry sorter according to one embodiment.
Figure 2:
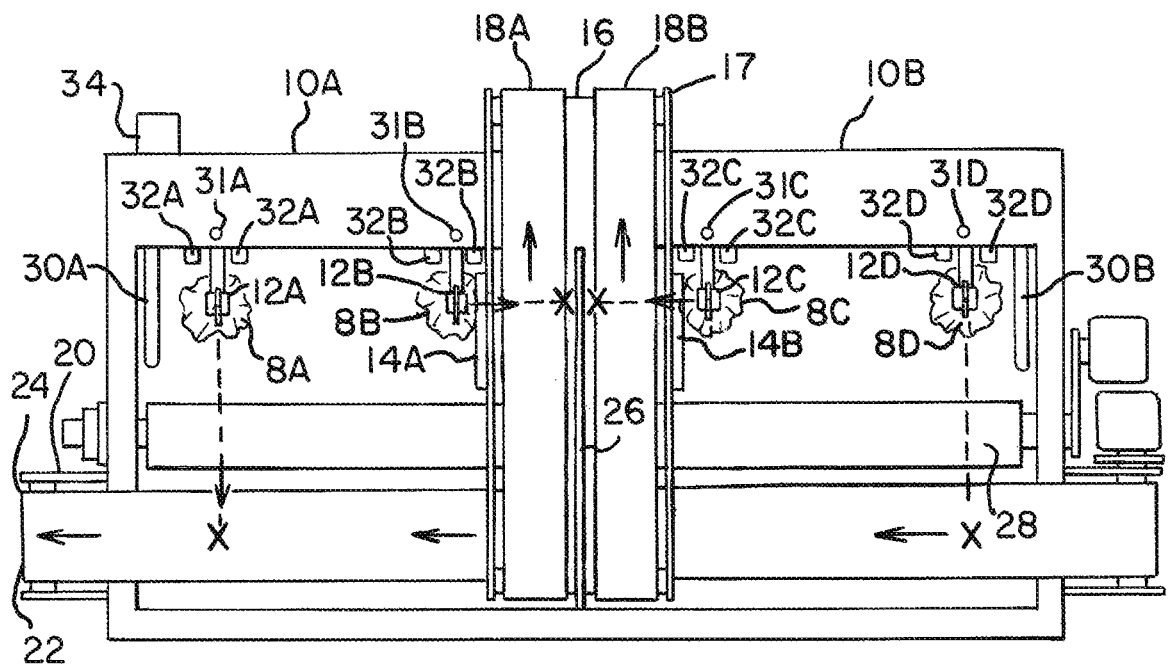
FIG. 2 is a top view of the laundry sorter of FIG. 1.
Figure 4:
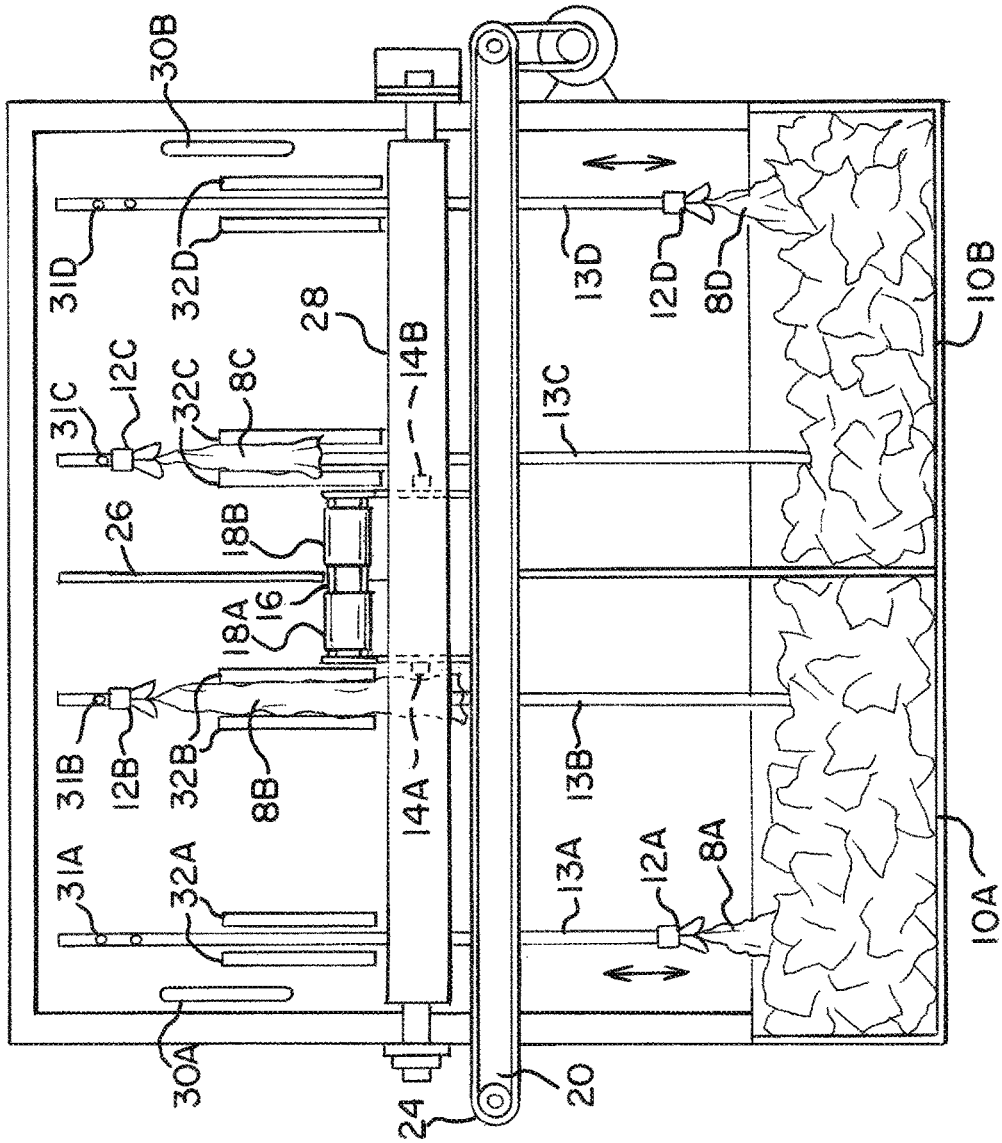
FIG. 4 is a front view of the laundry sorter of FIG. 1.
Figure 3:
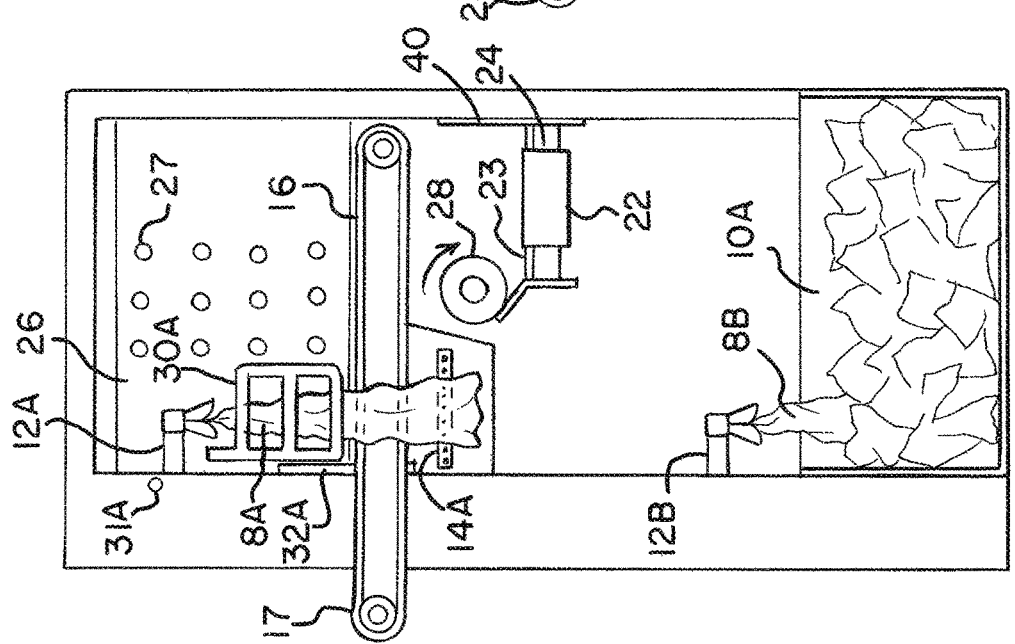
FIG. 3 is a side view of the laundry sorter of FIG. 1.

FIG. 1 shows a perspective view of one embodiment of a laundry sorting system, such as an apparatus for sorting towels. FIG. 2 shows a top view of the embodiment. FIG. 3 shows a side view of the embodiment. FIG. 4 shows a front view of the embodiment. The embodiment is an apparatus for sorting towels of different sizes from a load of towels. The laundry sorting system may be for sorting other articles of laundry or textiles.

The apparatus for sorting towels of FIGS. 1-4 shows one embodiment of the laundry sorting system. The sensor is one or more optical sensors 14 with or without one or more clamp position sensors 31. Other types or arrangements of sensors may be used. The ports are air nozzles 30, 32 but other types of ports (e.g., blowers) for applying force through fluid media (e.g., air) may be used. The tracks are conveyors 16, 20 but other types of tracks (e.g., chutes, movable clamps, or bins) may be used. Additional, different, or fewer components may be provided.

FIGS. 1-4 show one apparatus positioned within a single frame structure. Different portions of the apparatus are shown in different views to illustrate the components in operation of various stages for sorting towels of two sizes (e.g., face towels and hand towels). The differences in size may result in different height of the sorter apparatus. In one embodiment, the stages are built together within the frame work in as small a space as possible while providing sufficient volume for sorting. Various plates for safety and preventing operators from entanglement within the sorter are included, but not shown. Electrical, hydraulic and air pressure cables and hoses interconnect various components for controlling and operating sorting. These cables and hoses are configured and routed as is known in the art or later developed.

The apparatus is shown in FIGS. 2 and 4 as including four clamps 12A-D and corresponding clamp runs 13A-D, but more or fewer clamps 12A-D and clamp runs 13A-D may be used. All or a subset of the clamps 12A-D and clamp runs 13A-D feed articles to the same two conveyors 16, 20. From each clamp 12A-D, a hanging towel may be blown by the air nozzles 30A-B, 32A-D to either of the conveyors 16, 20, depending on the size of the towel sensed by the sensors 14, 31. Each path operates the same or similar. The "A," "B," "C," and "D" paths are described below together, but are separate paths corresponding to separate clamp runs 13A-D. The paths are configured and operate the same and deposit the towels from a same or different side and from a same or different distance to the conveyor 16 for one size or group of sizes. The paths are configured to deposit the towels from a same side and from a same distance to the conveyor 20 for another size or group of sizes. The paths may be different in other embodiments. One, two, three, four (shown), or other numbers of paths may be provided. Different paths may deposit in different or the same directions and be on the same or different sides of the deposit locations.

The apparatus includes the bins 10A-B, clamps 12A-D, clamp runs 13A-D, sensors 14A-B, conveyor 16, conveyor 20, plate 26, roller 28, air nozzles 30A-B, sensors 31A-D, air nozzles 32A-D, wall 40, and controller 34. Additional, different, or fewer components may be provided. For example, the roller 28 is not provided. As another example, the sensors 31A-D are not provided where the clamps 12 move to a limited or same stop point for drop-off or sorting. In yet other examples, other sensors, tracks, and/or ports may be used.

The bin 10 is divided into two bins 10A and 10B. A single combined bin 10 or separate bins for each clamp 12A-D may be provided. The bins 10A-B each hold a plurality of towels 8 in an organized or disorganized arrangement. The bins 10A, 10B are of a same or different sizes, shapes and/or materials, such as metal boxes with open tops of a same size. In other embodiments, the bin 10 is a laundry truck or other structure for holding a jumble of towels 8.

In one embodiment, each bin 10A, 10B includes a bottom that tapers towards a clamp pick-up position. As the towels 8 are removed from the bins 10A, 10B, the remaining towels 8 migrate toward the clamp pick-up positions. At the pick-up locations for the clamps 12A-D, a well or lower region may be provided for holding the load at the pick-up location. Alternatively, the bins 10A-B have flat bottoms.

Gravity may be used to position the loads adjacent to or at a pick-up location. Alternatively, pushers move the towels 8 towards the pick-up locations.

The clamps 12A-D are operable to clamp the towels 8 from the pick-up locations, respectively, of each separate clamp run 13A-D. The clamps 12A-D are each a chuck, scissor clamp, two opposing plates, jaws, pinching roller, pinching conveyors, vacuum device or other structures operable to hold a towel 8. In one embodiment, the clamps 12A-D are scissor clamps with serrated edges for better clamping towels 8. Plastic, metal, wood or other materials may be used. The clamps 12A-D are actuated by pneumatic cylinders, so one or both jaws of the clamps 12A-D connect with the pneumatic cylinder. In alternative embodiments, an electric servo, an air driven cylinder, a hydraulic cylinder, a motor, a valve, or other mechanisms are provided for actuating the clamps 12A-D.

The clamps 12A-D and associated actuators are connected to a drive. In one embodiment, the drive is a pulley and motor with an endless belt or chain. For example, a timing belt with an inverter is used. Other structures may be used, such as pneumatic or hydraulic rodless cylinders. The clamps 12A-D and actuators connect with the endless chain, such as using bolts and plates. Using an electrical control and sensors, the drive structure positions the clamps 12A-D adjacent to or in the loads of towels 8 at the pick-up locations and hanging above the bins 10 for transfer to the conveyors 16, 20 in sorting.

The drives move the clamps 12A-D to the pick-up locations in the bins 10A-B. The clamps 12A and 12B have pick-up locations in bin 10A, and the clamps 12C and 12D have pick-up locations in the bin 10B. The "A" and "B" paths operate in synchronization so that one clamp 12 is at the release location at the top of the clamp run 13 while the other clamp 12 is at the pick-up location at a bottom of the clamp run 13. This synchronization allows shared use of the sensors 14 and air nozzles 30, 32. There may or may not be synchronization between the opposite sides of the conveyor 16 (e.g., clamps 12A and 12B may or may not move in synchronization with the clamps 12C and 12D).

At the pick-up locations, the clamps 12A-D each clamps one or more towels 8 in the respective path. The clamps 12A-D are sized to most likely select a single towel 8A-D, such as having jaws that extend only about an inch to two inches. In response to or after the closing of the clamps 12A-D, the drives move the clamps 12A-D and the towels 8A-D away from the pick-up locations. The clamps are moved upward, such as vertically, so that the towels 8A-D hang downward from the clamps 12A-D without interference.

The clamped towels 8A-D and the clamps 12A-D are moved away from the loads, such as upwards, in each of the separate clamp runs 13. The clamp runs 13A-D are substantially parallel, such as all being vertical, for substantially parallel movement of the clamps 12A-D. "Substantially" is used for the parallel arrangement of the clamp runs 13A-D and movement to provide for tolerance and/or for deviation by 10 degrees or less. Non-parallel clamp runs 13A-D may be used.

The drives move the clamps 12A-D to the drop-off locations at the top of or other location along the clamp runs 13A-D. The movement positions the towels 8A-D at the top or another sorting drop-off location of the respective clamp runs 13A-D.

The sensors 31A-D sense the position of the clamps 12A-D, respectively at the drop-off positions. The sensors 31A-D are metal sensors, such as magnetic or conductive sensors. Timing on the timing chain of the drive and/or electric light sensors may alternatively be used to detect that the towels 8A-D or clamps 12A-D are positioned at the drop-off location for sorting. For example, a light sensor detects the presence of the towels 8 regardless of size at an upper position or other position ready for sorting. The different clamps 12A-D are positioned at the respective drop-off locations at the same (e.g., clamp 12A and clamp 12D or clamp 12B and clamp 12C as shown in FIG. 4) and/or different times (e.g., clamp 12A and clamp 12B and clamp 12C as shown in FIG. 4).

The clamps 12A and 12B operate on one side of the conveyor 16. The clamps 12C and 12D operate on another side of the conveyor 16. In other embodiments, the clamps 12A-D are only on one side of the conveyor 16. The clamps 12A-D operate on one side of the conveyor 20. In other embodiments, one or more clamps 12A-D operate on opposite sides of the conveyor 20.

The sensors 14A and 14B are light sensors or optical sensors. In one embodiment, the sensors 14A and 14B are infrared sensors where emitters are placed opposite to the sensors 14A and 14B. For example, the clamp runs 13A and 13B are between the emitter and the sensor 14A, and the clamp runs 13C and 13D are between the emitter and the sensor 14B. The sensors 14A and 14B may be single sensors. Alternatively, a sensor array (e.g., sensor bar) is used. In other embodiments, multiple sensors are provided to sense at different locations or heights from the bins 10A and 10B.

The sensors 14A and 14B are arranged to establish a difference in the towels 8A-D while hanging from the clamps 12A-D. The sensors 14A and 14B are positioned at a height that is below the top of the conveyor 16 and above a top of the conveyor 20. Other positions, such as above the top of the conveyor 16 and/or below the top of the conveyor 20 may be used. The sensors 14A and 14B are below the clamps 12A-D at the uppermost locations and above the bins 10A and 10B. This positioning distinguishes between different size towels. The position is a threshold to indicate a larger or smaller towel.

In other embodiments, multiple sensors are used at different positions for redundancy and/or to sense more than two sizes. In alternative embodiments, the sensors 14A and 14B measure a distance along the towel 8A-D as the towel 8A-D passes by, so may be at any height along the clamp run 13A-D. For example, the speed of movement of the clamps 12A-D is known or measured and the time from initial blockage to clearance is measured with the optical sensor 14A-B. The length is calculated from the time and speed by the controller 34 to determine the size.

The size of the towels 8A-D is determined by the length hanging from the clamps 12A-D. The length hanging may vary depending on where on the towel 8A-D the clamp 12A-D clamps. The sensors 14A and 14B may be positioned so that a bottom of all of the range of possible lengths of the smaller towels is above the sensors 14A and 14B and a bottom of all of the range of possible lengths of the larger towels is below the sensors 14A and 14B. Alternatively, the sensors 14A and 14B are positioned to assure only large or only small towels 8A-D are sorted in one direction and the other size towels 8A-D and some of the small size towels 8A-D are sorted the other direction. Depending on the clamping location, some of the small towels may be sorted as large, or some of the small towels may be sorted as small.

If the sensors 14A and 14B sense a towel 8A-D when the sensor 31A-D senses the clamp 12A-D at a drop-off location, then the towel 8 is a large towel. If the sensors 14A and 14B does not sense a towel 8A-D when the sensor 31 senses the clamp 12A-D at a drop-off location, then the towel 8A-D is a small towel or no towel 8 was clamped. The sensor position and the hanging of the towel 8A-D from the clamp 12A-D are used to distinguish between two different sizes of towels. Sensors at other heights may be used to distinguish between three or more different sizes of towels.

Due to the synchronous operation, each sensor 14A and 14B is measuring a single towel 8A-D at a given time for sorting. One sensor 14A is for sensing on one side of the conveyor 16, and the other sensor 14B is for sensing on the other side of the conveyor 16. FIG. 3 shows a towel 8A that is long, so has a bottom interfering with light sensing by the sensor 14A. The towel 8A is treated as a large towel. FIG. 4 shows the towel 8B as a long towel and the towel 8C as a short towel. The lengths of the towels 8A-D are measured when those towels 8A-D are lifted from the bins 10A and 10B, such as when hanging from the clamps 12A-D at the drop-off location.

Other sensors may be provided. Sensors for determining proper position, layout, or errors in processing, such as infrared or optical sensors, are used at any position or stage of processing. The sensors provide input for controlling the conveyors, clamps, drives or other components. Any now known or later developed sensors may be used.

The conveyor 16 has a top portion operable to convey from one side towards another side 17. The conveyor 16 includes at least two rollers with one or more belts 18A and 18B extending between each roller. The belts 18A and 18B are endless straps of fabric, rubber, or other material. The conveyor 16 includes a platform beneath the straps in between the rollers in one embodiment, but embodiments may be provided without a platform. The conveyor 16 may have walls on each side to keep towels 8 placed on the conveyor 16 from falling off the sides. The end 17 is an exit for outputting towels of a given size or range of sizes. The length of the conveyor 16 along with direction of travel is from about 2 to 5 feet, but shorter or longer lengths may be provided. The conveyor 16 is operable to convey towels 8A-D along the top surface and off the end 17.

The conveyor 16 is positioned above the bins 10A and 10B and below the drop-off location of the clamps 12A-B. The top surface is positioned at a height so that towels 8A-D blown from the drop-off locations land directly or indirectly on the top surface. The conveyor 16 is positioned between paths (e.g., between clamp runs 13A/13B and clamp runs 13C/13D). Other lateral positions may be provided. The conveyor 16 is a track positioned to receive the towels blown from the different drop-off locations.

The conveyor 20 has a same or different structure as the conveyor 16. For example, only one strap 22 is provided instead of two straps 18A and 18B. As another example, conveyor 20 has one wall 40 and a roller 28 other the other side instead of a wall. The conveyor 20 may be longer than the conveyor 16, but is shorter or a same length in other embodiments. The conveyor 20 conveys along the top surface toward an end 24, providing an exit location for the towels 8A-D.

The conveyor 20 is positioned below the conveyor 16. The conveyor 20 has a top surface for receiving larger towels 8A-D. By being positioned below the conveyor 16, the larger or longer towels 8A-D are more likely to be blown onto the conveyor 20. The conveyor 20 is a track positioned to receive the towels blown from the different drop-off locations.

The conveyor 20 is positioned in a different orientation than the conveyor 16. The conveyor 20 conveys in a different direction than the conveyor 16, such as being at least 45 degree difference in conveyance directions when viewed from above. In the example of FIG. 2, the conveyors are oriented at 90 degrees to each other. The conveyors 16, 20 may convey in a same direction (i.e., be parallel) but are spaced apart in height and/or lateral position.

The conveyor 16 provides a location or locations for receiving towels of one size or range, such as relatively smaller towels 8A-D. Using the position of the plate 26, different belts 18A and 18B may receive towels 8A-B and 8C-D from the paths on the different sides. The conveyor 20 provides a location or locations for receiving towels of another size or range, such as relatively larger towels 8A-D.

The plate 26 is positioned vertically above the conveyor 16. The plate 26 is metal but other materials (e.g., plastic, fiberglass, or wood) may be used. The plate 26 is positioned in parallel with a direction of conveyance and above a center of the conveyor 16. Other positions may be used, such as an extended side wall. The plate 26 is sized to block blown towels 8A-D so that the towels 8A-D drop under gravity to the top of the conveyor 16. The towels 8A-D are blown to the plate 26 and then fall to the track formed by the conveyor 16.

The plate 26 is impervious to air, such as being a solid plate. In one embodiment shown in FIG. 3, the plate 26 includes one or more holes 27. In other embodiments, the plate 26 is formed from a screen or other air pervious structure.

The conveyor 20 has the wall 40 positioned on one side. The wall 40 is for blocking the towels 8A-D blown to the wall 40 and/or onto the top of the conveyor 20.

The roller 28 is a powered roller, such that the roller 28 rotates where an upper or top portion rotates towards the top surface of the conveyor 20. The roller 28 is covered in rubber or other material for gripping or causing friction with the towels 8A-D (e.g., bottom of the towels 8A-D as passing over the roller 28) to move the towel 8A-D onto the conveyor. The material has insufficient grip to hold the towel 8A-D around the roller 28. The roller 28 rotates to carry the towel 8A-D towards the conveyor 20. In alternatives, a wall is used instead of the roller 28.

The roller 28 extends along a length of the conveyor 20 or at least at locations where the towels 8A-D are blown onto the conveyor 20. The roller 28 is substantially parallel with and adjacent to the conveyor 20. "Substantially" parallel is used to provide for manufacturing tolerance. Non-parallel placement may be used. The roller 28 is positioned to have an upper surface above the uppers surface of the conveyor 20.

The air nozzles 30A-B and 32A-D are holes with or without baffles or flow directors. The air nozzles 30A-B and 32A-D are ports arranged to blow towels, other articles of laundry, or textiles towards different locations.

In one embodiment, the air nozzles 30A-B are hollow bars with a plurality of holes directed towards the plate 26. For example, the air nozzles 30A-B have tubes forming a figure "8" shape (see FIG. 3). A plurality of holes are arranged to blast air or other fluid towards the plate 26 for blowing towels 8A-D onto the conveyor 16.

The air nozzles 32A-D are holes with or without baffles or flow directors. In one embodiment, each air nozzle 32A-D is formed by two bars or tubes with holes. The bars or tubes are placed parallel with and on both sides of the clamp runs 13A-D to blow air or other fluid towards the wall 40 and/or conveyor 20. A plurality of holes are arranged to blast air or other fluid towards the plate 40 for blowing towels 8A-D onto the conveyor 20.

The air nozzles 30A-B and 32A-D are positioned to blow towels 8A-D substantially horizontally. "Substantially horizontally" is used to allow for downward or upward blowing by less than 20 degrees from horizontal. The air nozzles 30A-B and 32A-D blow the towels 8A-D sideways towards the conveyors 16, 20. Gravity may cause the towels 8A-D to drift downward, so the air nozzles 30A-B and 32A-D may be positioned at a same height, below, or above the towels 8A-D hanging in the drop-off location. The height and positioning is so that the towels 8A-D are blown to the desired location.

The air nozzles 30A-B and 32A-D connect with the same or different sources of pressure. Any amount of pressure may be used, such as about 90 pounds of air pressure. The controller 34 controls valves for causing the air blasts. The air nozzles 30A-B and 32A-D create air blasts or air walls to blow the towels 8A-D to move them to the conveyors 16, 20.

The air nozzle 30A is positioned to blow the towels 8A and 8B to the plate 26. In FIG. 2, towel 8B has an arrow showing blowing to an "X" on the plate 26 and/or conveyor 16. Similarly, the air nozzle 30B is positioned to blow the towels 8C and 8D to the plate 26. In FIG. 2, towel 8C has an arrow showing blowing to an "X" on the plate 26 and/or conveyor 16. Due to synchronization, only one towel (8A or 8B) or (8C or 8D) per side is positioned for sorting at a time.

The air nozzles 32A-D are positioned to blow the towels 8A-D respectively to the plate 40 or conveyor 20. In FIG. 2, the towels 8A and 8D have arrows showing blowing to an "X" on the conveyor 20.

Depending on the size of the towel 8A-D sensed by the sensor 14A, 14B, the towels 8A-D hanging from any of the clamps 12A-D may be blown either to the conveyor 16 or the conveyor 20, providing sorting. Different air nozzles 30A-B and 32A-D blow different directions to sort. In alternative embodiments, one or more air nozzles are rotatable so that than one or a group of air nozzles can blow in the different directions for sorting.

The controller 34 is a general processor, signal processor, application specific integrated circuit, field programmable gate array, control processor, computer, digital circuit, analog circuit, other control device, or combinations thereof. Multiple devices for sequential and/or parallel processing or control may be used as the controller 34. The controller 34 is positioned anywhere on the frame of the apparatus. In other embodiments, the controller 24 is spaced from the apparatus, such as being part of a field or industrial control panel.

The controller 34 is configured by hardware, firmware, and/or software to operate the apparatus. The controller 34 is configured to activate the air nozzles 30A-B and 32A-D based on the size determined from the sensors 14A-B with or without sensors 31A-D. When the size (e.g., length hanging from the clamp 12A-D) of the towel 8A-D is larger (e.g., longer), the air nozzle 32A-D for the clamp 12A-D holding the towel 8A-D is activated. When the size of the towel 8A-D is smaller, the air nozzle 30A-B for the clamp 12A-D holding the towel 8A-D is activated. In other embodiments, the larger towels 8A-D are placed on the conveyor 16, and the smaller towels 8A-D are placed on the conveyor 20.

When the clamp 12A has a towel 8A hanging at the drop-off location, the sensor 31A detects the clamp position as being at the drop-off location. The sensor 14A detects the size of the hanging towel 8A at that drop-off position. In FIGS. 2 and 3, the towel 8A is shown as being longer or larger size. The air nozzle 32A is activated to blow the towel 8A over or onto the roller 22 to the conveyor 20 or wall 40. The air nozzle 30A is not activated. When the towel 8A is smaller or shorter, then the air nozzle 30A is activated to blow the towel 8A against the plate 26 and/or onto the conveyor 16. The air nozzle 32A is not activated.

When the clamp 12B has a towel 8B hanging at the drop-off location, the sensor 31B detects the clamp position as being at the drop-off location. The sensor 14A detects the size of the hanging towel 8B at that drop-off position. In FIG. 2, the towel 8B is shown as being shorter or smaller size. In the example of FIG. 4, the towel 8B is shown as being longer or larger size. Either case may exist. When the towel 8B is longer or larger, the air nozzle 32B is activated to blow the towel 8B over or onto the roller 22 to the conveyor 20 or wall 40. The air nozzle 30A is not activated. When the towel 8B is smaller or shorter, then the air nozzle 30A is activated to blow the towel 8B against the plate 26 and/or onto the conveyor 16. The air nozzle 32B is not activated.

When the clamp 12C has a towel 8C hanging at the drop-off location, the sensor 31C detects the clamp position as being at the drop-off location. The sensor 14B detects the size of the hanging towel 8C at that drop-off position. In FIGS. 2 and 4, the towel 8C is shown as being shorter or smaller size. The towel 8C may by longer or larger size. Either case may exist. When the towel 8C is longer or larger, the air nozzle 32C is activated to blow the towel 8C over or onto the roller 22 to the conveyor 20 or wall 40. The air nozzle 30B is not activated. When the towel 8C is smaller or shorter, then the air nozzle 30B is activated to blow the towel 8C against the plate 26 and/or onto the conveyor 16. The air nozzle 32C is not activated.

When the clamp 12D has a towel 8D hanging at the drop-off location, the sensor 31D detects the clamp position as being at the drop-off location. The sensor 14B detects the size of the hanging towel 8D at that drop-off position. In FIG. 2, the towel 8D is shown as being longer or larger size. The towel 8D may by shorter or smaller size. Either case may exist. When the towel 8D is longer or larger, the air nozzle 32D is activated to blow the towel 8D over or onto the roller 22 to the conveyor 20 or wall 40. The air nozzle 30B is not activated. When the towel 8D is smaller or shorter, then the air nozzle 30B is activated to blow the towel 8D against the plate 26 and/or onto the conveyor 16. The air nozzle 32D is not activated.

A threshold is applied to determine how to sort the towels 8A-D. The threshold is established by the relative positions of the clamps 12A-D in the drop-off locations and the position of the sensors 14A and 14B. Alternatively, the threshold is established by the controller 34. A length of the towels 8A-D may be measured and applied via calculation to a stored threshold to determine sorting. The controller 34 controls the air nozzles 30A-B and 32A-D to sort the towels 8A-D by placing them on one of the two conveyors 16, 20.

The clamps 12A-D are also controlled by the controller 34. In addition to controlling closing the clamps 12A-D and lifting the towels 8A-D, the controller 34 causes the clamps 12A-D to release the towel 8A-D. The clamps 12A-D are controlled to release at a same time as, slightly (e.g., 0.1 seconds) before, or slightly (e.g., 0.1 seconds) after activation of the air blasts for sorting. Upon release, the air blasts move the towels 8A-D to the desired conveyors 16, 20. Different towels are moved at different times. Towels on opposite sides or using different air nozzles 30A-B and 32A-D may be moved at a same time.

Figure 5:
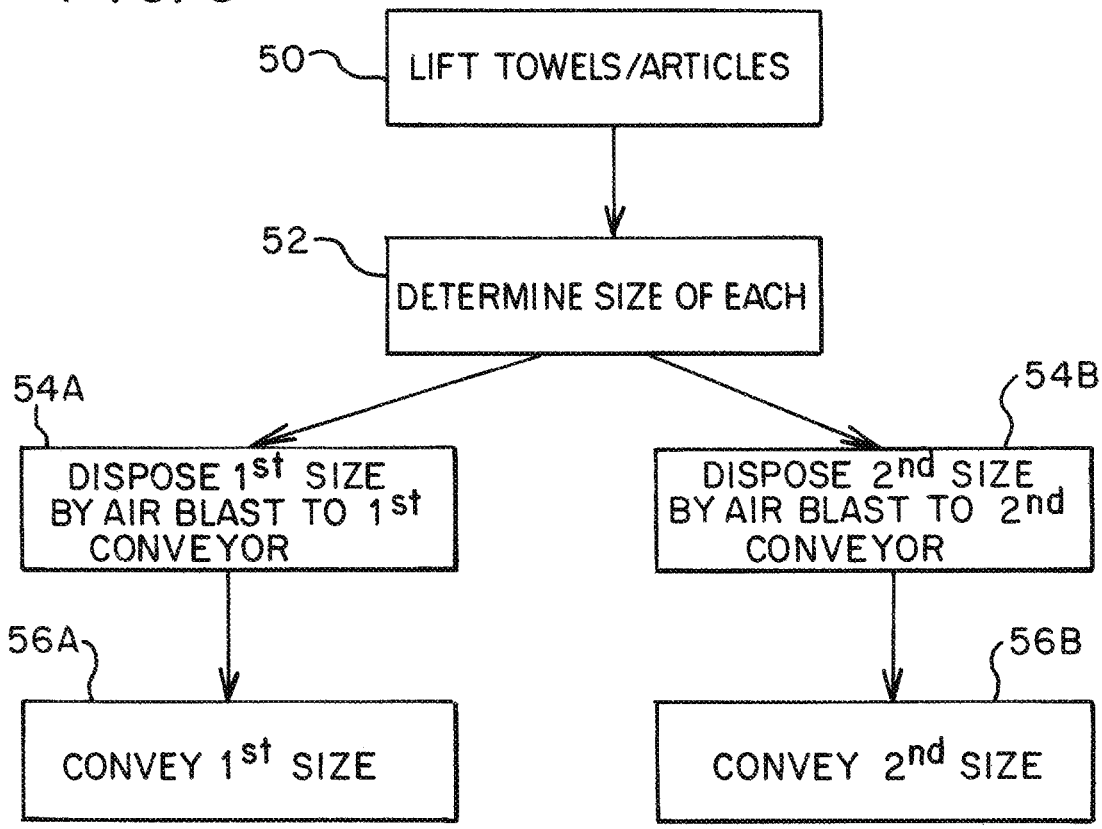
FIG. 5 is a flow chart diagram of one embodiment of a method for sorting laundry.

FIG. 5 shows one embodiment of a method for sorting different sized towels. Clamp release and blowing are used to sort based on sensing size. The apparatus or sorting system of FIGS. 1-4 or other device are used to implement the method.

Additional, different, or fewer acts may be provided. For example, acts 54 and 56 may be performed for more than two paths where sorting is between three sizes or size ranges. The acts are performed in the order shown (numerical or top to bottom) or a different order.

In act 50, the towels are lifted from a jumble. Each towel is lifted individually by a clamp or other structure. Different towels may be lifted by different clamps. Each clamp lifts one towel at a time. Where two towels are gripped by the same clamp, the sorting operates based on the longest or largest of the two towels.

In act 52, the size of each of the towels is determined while lifted. One or more sensors are used by a controller to determine the sizes of the towels. Towel size may be measured using sensors based on sensor position with the towels hanging from a fixed or measured height. Towel size may be sensed in other ways, such as measuring a length of the towel as hanging from a clamp.

In one embodiment, an optical sensor measures the size. Towels of the one size do not block the optical sensor when lifted to a set point, and towels of the another size do block the optical sensor when lifted to the set point. Whether the sensor is blocked or not provides a measurement of the size.

FIG. 5 sorts between towels of two different sizes or size ranges. In acts 54A and 54B, the towels are disposed to different locations based on the determined size. In act 54A, an air blast from one or more nozzles or ports and from one or more directions disposes any towel determined to be of one size on one conveyor. The towels are blown from a hanging or clamped drop-off location in a direction to the conveyor. In act 54B, an air blast from one or more nozzles or ports and from one or more directions disposes any towel determined to be of another size on another conveyor. The towels are blown from a hanging or clamped drop-off location in another direction (i.e., different direction) to the other conveyor. Where more than two sizes or size ranges are sorted, air blasts in other directions dispose other sizes onto other conveyors.

In the apparatus of FIGS. 1-4, the towels of one size (e.g., smaller towels or wash cloths) are blown against a plate positioned above the conveyor. Gravity then drops the towel onto the conveyor. The towels of the other size (e.g., larger towels such as hand towels and/or bath towels) are blown onto the roller, onto the other conveyor, and/or against the wall. As the air blast is generated by opening a valve or shortly after (e.g., 0.1 seconds), the clamp releases the towel. The air blast is sustained long enough (e.g., 0.5 seconds) to blow the towel to the desired sorted location.

In acts 56A and 56B, the towels are conveyed to exit locations. In act 56A, the towels of one size or size range (e.g., washcloths) are conveyed by the one conveyor. In act 56B, the towels of the other size or size range are conveyed by the other conveyor.

The different sized towels are conveyed in different directions. For example, the frame has a generally prismoid shape (e.g., rectangular cube shape). The different conveyors convey to exit points on different sides. In the apparatus of FIGS. 1-4, the conveyors convey along directions at 90 degrees to each other from a top view. In alternative embodiments, the conveyors convey in a same direction, but at different lateral and/or height positions.

The conveyors convey to drop the towels into separate bins, such as separate laundry trucks. Alternatively, one or both conveyors convey to different laundry processing equipment, such as washers, separators, spreaders, ironers, stackers, and/or folders. For example, the conveyor of larger towels conveys to a laundry truck and the conveyor of smaller towels conveys to a spreader or stacker. As another example, the conveyor of larger towels conveys to a folder and the conveyor of smaller towels conveys to a different folder. The different folders are configured for spreading and folding towels of respective sizes.

While the invention has been described above by reference to various embodiments, it should be understood that many changes and modifications can be made without departing from the scope of the invention. For example, any number of additional stages may be provided. Different clamp, conveyor, sensor, actuator or drive structures may be used, including now known or later developed structures. It is therefore intended that the foregoing detailed description be understood as an illustration of the preferred embodiment of the invention and not as a definition of the invention. It is only the following claims, including all equivalents, that are intended to define the scope of the invention.

What is claimed is:

1. An apparatus for sorting towels, the apparatus comprising:
   a first clamp positioned to clamp a first one of the towels from a bin holding the towels, the first clamp movable to lift the first towel from the bin;
   a first sensor positioned to measure a first length of the first towel hanging from the first clamp when lifted from the bin;
   a first air nozzle positioned to blow the first towel onto a first conveyor;
   a second air nozzle positioned to blow the first towel onto a second conveyor, the first conveyor positioned to convey the first towel in a first direction and the second conveyor positioned to convey the towel in a second direction that is different from the first direction; and
   a controller configured to activate the first air nozzle when the first length is below a threshold and activate the second air nozzle when the first length is above the threshold.

2. The apparatus of claim 1 wherein the first sensor comprises an infrared emitter and infrared sensor.

3. The apparatus of claim 1 wherein the first sensor comprises an optical sensor bar positioned above the bin and below an uppermost position of the first clamp, the threshold being established by the positioning of the sensor bar relative to the uppermost position.

4. The apparatus of claim 1 wherein the first conveyor is above the second conveyor, and the second direction is different than the first direction by at least 45 degrees.

5. The apparatus of claim 1 wherein the first and second air nozzles are positioned to blow the first towel substantially horizontally as the first laundry clamp releases the first towel, the first and second conveyors positioned below the first and second air nozzles, respectively.

6. The apparatus of claim 1 wherein the first and second air nozzles comprise bars with holes.

7. The apparatus of claim 1 further comprising a roller substantially parallel with and adjacent to the second conveyor, the roller rotatable to carry the first towel towards the second conveyor.

8. The apparatus of claim 1 further comprising a plate positioned above the first conveyor such that the first towel is blown by the first nozzle into the plate and drops to the first conveyor from the plate.

9. The apparatus of claim 8 wherein the plate has a plurality of holes.

10. The apparatus of claim 1 further comprising:
    a second clamp positioned to clamp a second towel from the bin, the second clamp moveable to lift the second towel along a second track substantially parallel to movement of the first clamp, the second track on a same side of the first conveyor as the first clamp;
    wherein the first sensor is positioned to measure a second length of the second towel hanging from the second clamp when lifted from the bin;
    wherein the first air nozzle is positioned to blow the second towel onto the first conveyor;
    a third air nozzle positioned to blow the second towel onto the second conveyor; and
    wherein the controller is configured to activate the first air nozzle when the second length is below the threshold and activate the third air nozzle when the second length is above the threshold.

11. The apparatus of claim 1 further comprising:
    a second clamp positioned to clamp a second towel from the bin, the second clamp moveable to lift the second towel along a second track substantially parallel to movement of the first clamp, the second track on an opposite side of the first conveyor than the first clamp;
    a second sensor positioned to measure a second length of the second towel hanging from the second clamp when lifted from the bin by the second clamp;
    a third air nozzle positioned to blow the second towel onto the second conveyor;
    a fourth nozzle positioned to blow the second towel onto the first conveyor; and
    wherein the controller is configured to activate the fourth air nozzle when the second length is below the threshold and activate the third air nozzle when the second length is above the threshold.

12. A method for sorting different sized towels, the method comprising:
    lifting towels from a jumble;
    determining the sizes of the towels while lifted;
    disposing, by air blast, the towels of a first size on a first conveyor and the towels of a second size on a second conveyor, wherein disposing comprises blowing the towels of the first size in a first direction and blowing the towels of a second size in a second direction different than the first direction; and
    conveying the towels of the first size by the first conveyor and the towels of the second size by the second conveyor.

13. The method of claim 12 wherein lifting comprises lifting individually by a clamp, and wherein disposing comprises releasing by the clamp in conjunction with the air blast.

14. The method of claim 12 wherein determining the sizes comprises measuring with an optical sensor where the towels of the first size do not block the optical sensor when lifted to set point and where the towels of the second size do block the optical sensor when lifted to the set point.

15. The method of claim 12 wherein disposing comprises blowing the towels of the first size against a plate positioned above the first conveyor.

16. The method of claim 12 wherein conveying comprises conveying by the first and second conveyors in different directions.

17. A laundry sorting system comprising:
- a sensor arranged to establish a difference in articles of laundry while hanging;
- one or more ports arranged to blow different ones of the articles of laundry towards different locations based on the difference; and
- a first track positioned to receive the articles of laundry blown to a first one of the different locations and a second track positioned to receive the articles of laundry blown to a second one of the different locations, the first track separate from and above the second track.

18. The laundry sorting system of claim 17 further comprising a plate positioned above the first track such that the first one of the different locations is on the plate, the articles of laundry blown to the plate dropping to the first track.

19. The laundry sorting system of claim 17 wherein the difference is a length while hanging from a moveable clamp.

* * * * *